(12) United States Patent
Curtis et al.

(10) Patent No.: US 9,122,958 B1
(45) Date of Patent: Sep. 1, 2015

(54) OBJECT RECOGNITION OR DETECTION BASED ON VERIFICATION TESTS

(71) Applicant: Social Sweepster, LLC., Fishers, IN (US)

(72) Inventors: Tod Joseph Curtis, Bedford, IN (US); Thomas Ryan McGrath, Chicago, IL (US); Kenneth Edward Jagacinski Schweickert, Lafayette, IN (US)

(73) Assignee: Social Sweepster, LLC, Fishers, IN (US)

( * ) Notice: Subject to any disclaimer, the term of this patent is extended or adjusted under 35 U.S.C. 154(b) by 90 days.

(21) Appl. No.: 14/181,077

(22) Filed: Feb. 14, 2014

(51) Int. Cl.
*G06K 9/62* (2006.01)
*G06T 7/40* (2006.01)

(52) U.S. Cl.
CPC ............ *G06K 9/6267* (2013.01); *G06K 9/6212* (2013.01); *G06T 7/408* (2013.01)

(58) Field of Classification Search
CPC .......... G06K 9/00261; G06K 9/00362; G06K 9/3241
USPC ........................................................ 382/224
See application file for complete search history.

(56) References Cited

U.S. PATENT DOCUMENTS

| | | | |
|---|---|---|---|
| 8,311,292 B2 | 11/2012 | Tian et al. | |
| 2011/0019920 A1* | 1/2011 | Hu | 382/195 |

OTHER PUBLICATIONS

Viola, Paul and Jones, Michael; "Rapid Object Detection Using a Boosted Cascade of Simple Features," pp. 1-9, Accepted Conference on Computer Vision and Pattern Recognition 2001, available at http://www.cs.cmu.edu.
Moreels, Pierre; Perona, Pietro; "A Probabilistic Cascade of Detectors for Individual Object Recognition," dated 2008, pp. 426-439, Springer-Verlag, Berlin Heidelberg.
"Socioclean—Understand and Protect Your Social Reputation," dated Jan. 30, 2014, pp. 1-2, Socioclean, available at http://socioclean.com/faq.htm.
"Reppler—Basic Information About How TrustedID Reppler Works for You," dated Jan. 30, 2014, pp. 1-2, Reppler, available at http://www.reppler.com/learn/.
"SimpleWash—Why to Use SimpleWash," dated 2013, pp. 1-2, While True Labs, LLC, available at http://simplewa.sh/about.

* cited by examiner

*Primary Examiner* — Mike Rahmjoo
(74) *Attorney, Agent, or Firm* — Brinks Gilson & Lione

(57) ABSTRACT

Object recognition systems, methods, and devices are provided. Candidate objects may be detected. The candidate objects may be verified as depicting objects of a predetermined object type with verification tests that are based on comparisons with reference images known to include such objects and/or based on context of the candidate objects. The object recognition system may identify images in a social networking service that may include objects of a predetermined type.

25 Claims, 10 Drawing Sheets

OBJECT RECOGNITION OR DETECTION BASED ON VERIFICATION TESTS

BACKGROUND

1. Technical Field.

This application relates to computer vision and, in particular, to object recognition or detection.

2. Related Art.

Social network use has expanded dramatically in recent years, with social networking services such as Facebook® (a registered trademark of Facebook, Inc. of Menlo Park, Calif.) boasting more than a billion users. Social networking services facilitate users posting text and images that may be viewed by others. Posted text and images may remain available for viewing and are often not removed. Accordingly, the amount of posted text may grow over time, and the number of posted images may increase over time.

SUMMARY

An object recognition system may be provided that includes an object detection module, multiple verification tests, a scoring module, and a verification module. The object detection module may apply a cascade classifier to a source image, which results in identification of candidate objects for a predetermined object type. Each of the verification tests may generate difference values for a candidate object identified by the object detection module and a corresponding reference image, where the corresponding reference image depicts an object of the predetermined object type, and where each one of the difference values represents an indication of a difference between a characteristic of the candidate object and a characteristic of the corresponding reference image. The scoring module may determine, for each of the candidate objects, a belief score for the candidate object based on the difference values for the candidate object. The belief score may indicate a likelihood that the candidate object is of the predetermined object type. The verification module may identify a set of detected objects based on the candidate objects and the belief scores for the candidate objects.

A computer readable storage medium may be provided that includes computer executable instructions. When executed, source images that are shared in a social networking service may be identified. A candidate object may be detected in any of the source images by applying a cascade classifier in search of an object of a predetermined object type. Difference values may be generated based on comparisons of characteristics of the candidate object with corresponding characteristics of a reference image. Each one of the difference values may indicate a difference between a respective one of the characteristics of the candidate object and a corresponding respective one of the characteristics of the reference image. A belief score may be generated for the candidate object based on differences between the difference values and target difference values. The belief score may indicate the likelihood that the candidate object is an object of the predetermined object type. Any of the source images that includes the candidate object may be identified as including the predetermined object type when the belief score exceeds a threshold belief score.

A method is provided to recognize objects in an image. A source image may be searched for any candidate objects of a predetermined object type by applying a cascade classifier associated with the predetermined object type to the source image. Scores, such as difference values, for a candidate object may be determined from a plurality of verification tests applied to the candidate object. Each one of the scores may be determined from a corresponding one of the verification tests. Each one of the scores may represent an indication of a difference between the candidate object and a set of reference images for the predetermined object type. A belief score may be determined for the candidate object from the scores for the candidate object. The belief score may indicate the likelihood that the candidate object is of the predetermined object type. The candidate object may be identified as a detected object of the predetermined object type when the belief score relative to a threshold belief score indicates the candidate object is of the predetermined object type.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

In one example, source images that are shared in a social networking service may be identified. For example, any images of a person that are publicly available may be identified. To search the source images for a predetermined object type, a cascade classifier associated with the predetermined object type may be applied to each of the source images. The predetermined object type may be a beer can, a beer bottle, or any other type of object. One or more candidate object may be identified by applying the cascade classifier.

However, the candidate object may not be an object of the predetermined type. Verification tests may verify whether the candidate object is such an object. Difference values may be generated based on comparisons of characteristics of the candidate object with corresponding characteristics of a reference image. The reference image may be an image known to depict an object of the predetermined object type. Each one of the difference values may indicate a difference between a respective one of the characteristics of the candidate object and a corresponding respective one of the characteristics of the reference image. A belief score may be determined for the candidate object based on differences between the difference values and target difference values. Each one of the target difference values may be an expected difference value for a corresponding one of the characteristics of any reference image and any candidate image that actually depicts an object of the predetermined object type. The belief score may indicate the likelihood that the candidate object is an object of the predetermined object type. The source image that includes the candidate object may be identified as including the predetermined object type when the belief score exceeds a threshold belief score.

Figure 1:
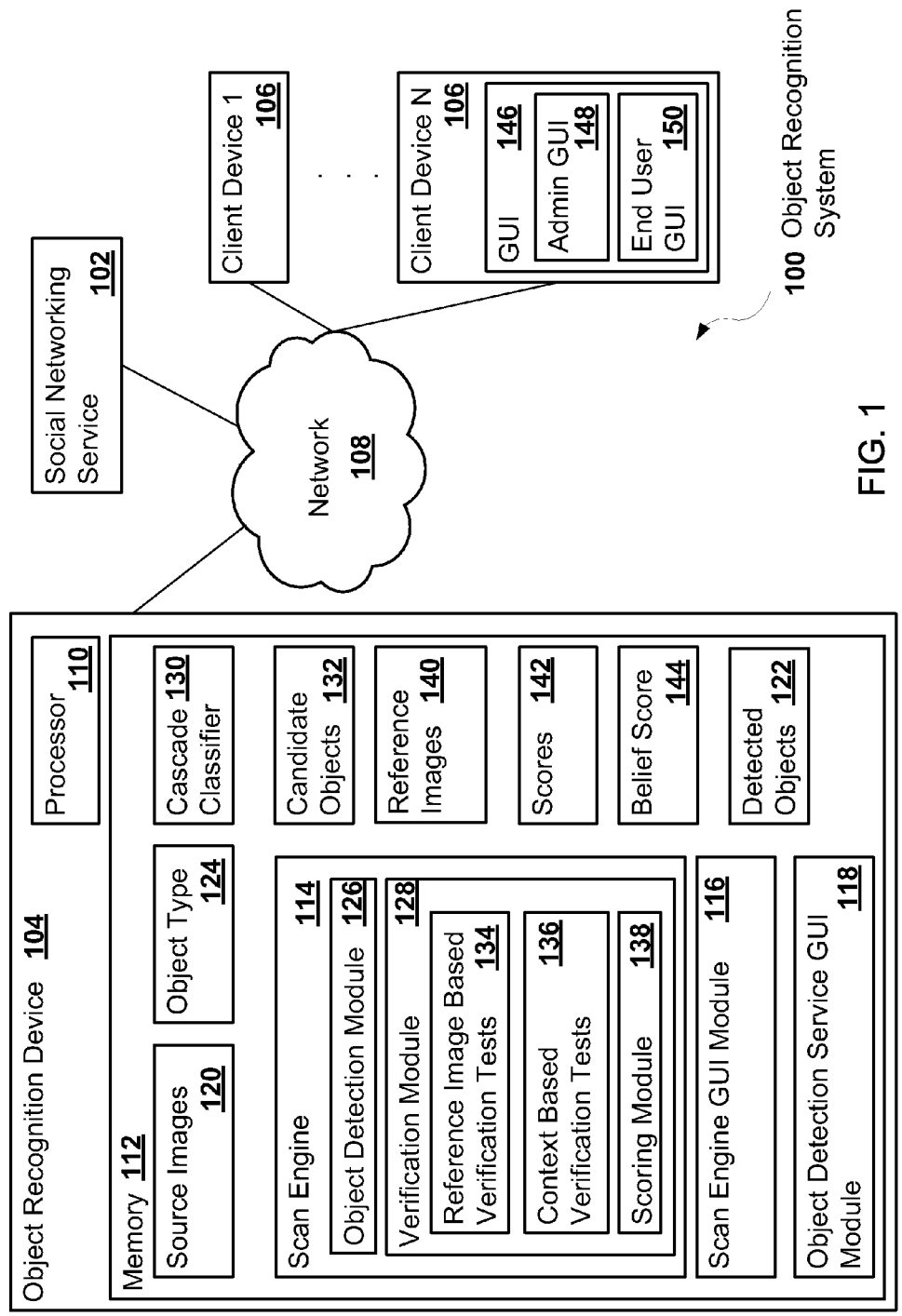
FIG. 1 illustrates an object recognition system.

FIG. 1 illustrates an object recognition system 100. The object recognition system 100 may recognize or detect objects in any context. For example, the object recognition system 100 illustrated in FIG. 1 recognizes objects in the context of a social networking service 102. In alternative examples, the system 100 may recognize objects a surveillance system, in a robotics system, or in any other context in which object recognition functionality may be desirable.

The system 100 may include an object recognition device 104 and one or more client devices 106. The object recognition device 104 may be in communication with the social networking service 102 and the client devices 106 over a network 108.

The object recognition device 104 may be included in any type of device. For example, the object recognition device 104 may be included in a computer, a server, a smart phone, a smart device, a mobile phone, a robot, an appliance, a circuit, and/or an integrated circuit chip. In one example, the object recognition device 104 may be included in a server or servers that host the social networking service 102.

The social networking service 102 may be a service through which people may build social networks or social relations among each other. The people in a social network may share, for example, interests, activities, backgrounds, and/or connections in real-life. In particular, the social network service 102 may facilitate uploading images that others may view. Examples of the social networking service 102 may include FACEBOOK®, INSTAGRAM® (INSTAGRAM is a registered trademark of Instagram, LLC of Menlo Park, Calif.), and/or any other social networking service.

Each of the client devices 106 may be any computing device. Examples of the client devices 106 may include a computer, a laptop, a tablet, a mobile phone, a smart phone, an appliance, or any other type of computing device. The client devices 106 may be referred to as clients of object recognition device 104 because the client devices 106 may use services provided by the object recognition device 104.

The network 108 may be any collection of transmission links over which data between computing nodes may be exchanged. For example, the network 108 may include a local area network (LAN), a wired network, a wireless network, a wireless local area network (WLAN), a WI-FI® network (WI-FI is a registered trademark of Wireless Ethernet Compatibility Alliance, Inc. of Austin, Tex.), a personal area network (PAN), a wide area network (WAN), the Internet, an Internet Protocol (IP) network, and/or any other communications network.

In FIG. 1, the object recognition device 104 is physically distinct from the social networking service 102 and the client devices 106. Alternatively or in addition, the object recognition device 104 may be included in the social networking service 102 and/or in one or more servers that host the social networking service 102. Alternatively or in addition, the object recognition device 104 may be included in one or more of the client devices 106.

The object recognition device 104 may include a processor 110 and a memory 112. The memory 112 may include a scan engine 114, a scan engine GUI (Graphical User Interface) module 116, and an object detection service GUI module 118.

The scan engine 114 may be a component that detects any objects 122 in the source images 120 that are of a predetermined object type 124, such as a plastic cup, a beer bottle, a tool, and/or a type of animal. The scan engine 114 may include an object detection module 126 and a verification module 128.

The object detection module 126 of the scan engine 114 may be a component that applies a cascade classifier 130 to the source images 120 or otherwise locates one or more candidate objects 132 in the source images 120. For example, application of the cascade classifier 130, such as an XML cascade, to any of the source images 120 may locate one or more candidate objects 132 that are possibly objects of the predetermined object type 124.

The verification module 128 may be a component that verifies that the candidate objects 132 are objects of the predetermined object type 124. The verification module 128 may include one or more reference image based verification tests 134, one or more context based verification tests 136, and a scoring module 138.

As described in more detail below, the reference image based verification tests 134 may be tests that compare the candidate objects 132 with reference images 140 to identify similarities and/or differences. The context based verification tests 136 may be tests that are based on a context of any of the candidate objects 132. For example, the context of a candidate object may be a location of candidate object relative to a face detected in a source image. As described in more detail later below, the context may include any context different from, and/or in addition to, the location of the candidate object relative to the detected face.

The scoring module 138 of the verification module 128 may be a component that generates scores 142 from one or more of the tests 134 and/or 136. Each of the scores 142 may represent an indication of a difference—or equivalently, a similarity—between one of the candidate objects 132 and one or more of the reference images 140 that depict the predetermined object type 124. Alternatively or in addition, the scoring module 138 may be a component that generates a belief score 144 from the scores 142 generated by one or more of the tests 134 and/or 136.

The belief score 144 may be any indication of the likelihood that the candidate object is an object of the predetermined object type 124. For example, the belief score 144 may be a numerical value, a percentage, and/or a symbol or a phrase, such as "likely" and "unlikely."

The scan engine GUI module 116 may be a component that generates a GUI 146 for configuring the behavior of the scan engine 114. For example, the scan engine GUI module 116 may generate one or more web pages that are viewed at the client devices 106. Alternatively or in addition, the scan engine GUI module 116 may generate the GUI 146 in an app or software application that executes in the client devices 106. Examples of such a GUI are provided later below and illustrated in FIGS. 6-8. The client devices 106 or a subset thereof may be devices used by one or more administrative users or developers. Alternatively or in addition, the client devices 106 or a subset thereof may be devices used by one or more end users. The GUI 146 generated by the scan engine GUI module 116 may be an administrator GUI 148 limited to use by administrative users in many examples.

The object detection service GUI module 118 may be a component that generates the GUI 146 for using the scan engine 114 in the context of the social networking service 102. Examples of such a GUI are provided later below and illustrated in FIGS. 9-10. The GUI 146 generated by the object detection service GUI module 118 may an end user GUI 150 for end users in many examples.

The graphical user interface (GUI) 106 generated by either GUI module 116 or 118 may be a type of user interface through which a human may interact with electronic devices, such as the client devices 146. The GUI 106 may include graphical icons and/or any other type of visual indicators to represent information and actions available to a user. The actions may be performed through direct manipulation of the graphical elements. More generally, the GUI 106 may be a text-based interface or text navigation interface.

During operation of the object recognition system 100, the scan engine 114 may search one or more of the source images 120 for the predetermined object type 124 or a set of predetermined object types. The source images 120 may be obtained from any source.

For example, when the object recognition system 100 is applied to one or more social networking services, such as the social networking service 102 in FIG. 1, the source images 120 may be obtained from the social networking service 102. The source images 120 may be images in a user's social network that are public, images posted by a user that are available to members of the user's social network, images in which a user is "tagged" or identified with, and/or images selected by any other criteria. The user may provide the object recognition device 104 with authorization to access the social networking service 102. The user may provide authorization by, for example, providing log-in credentials to the object recognition device 104.

In different examples, the source images 120 may be obtained from different sources of images. The source images 120 may be obtained from a web search for images associated with a person, for example. In the context of a robotics system, the source images 120 may be obtained from a camera mounted on a robot or from another image source in the robotics system. In the context of a surveillance system, the source images 120 may be obtained from a security camera.

The predetermined object type 124 or types may be any type of object that the object recognition system 100 is requested to find. For example, a user may wish to identify objects that a set of people, such as employers or family members, may find objectionable. Alternatively or in addition, a user may wish to identify object that may pose a security risk. Examples of the predetermined object type 124 may include a beer bottle, a beer can, a plastic cup, such as a SOLO® cup (SOLO is a registered trademark of Solo Cup Company of Lake Forest, Ill.), a beer bong, a can, a bottle, a backpack, a duffle bag, a weapon, a pistol, an animal, a person, a face, or any other type of object.

The predetermined object type 124 or predetermined object types may be predetermined in the sense that the object type 124 or types may be determined prior to searching the source images 120 for the object type 124 or types. A user, such as an administrative user, may identify the predetermined object type 124 or types.

Figure 2:
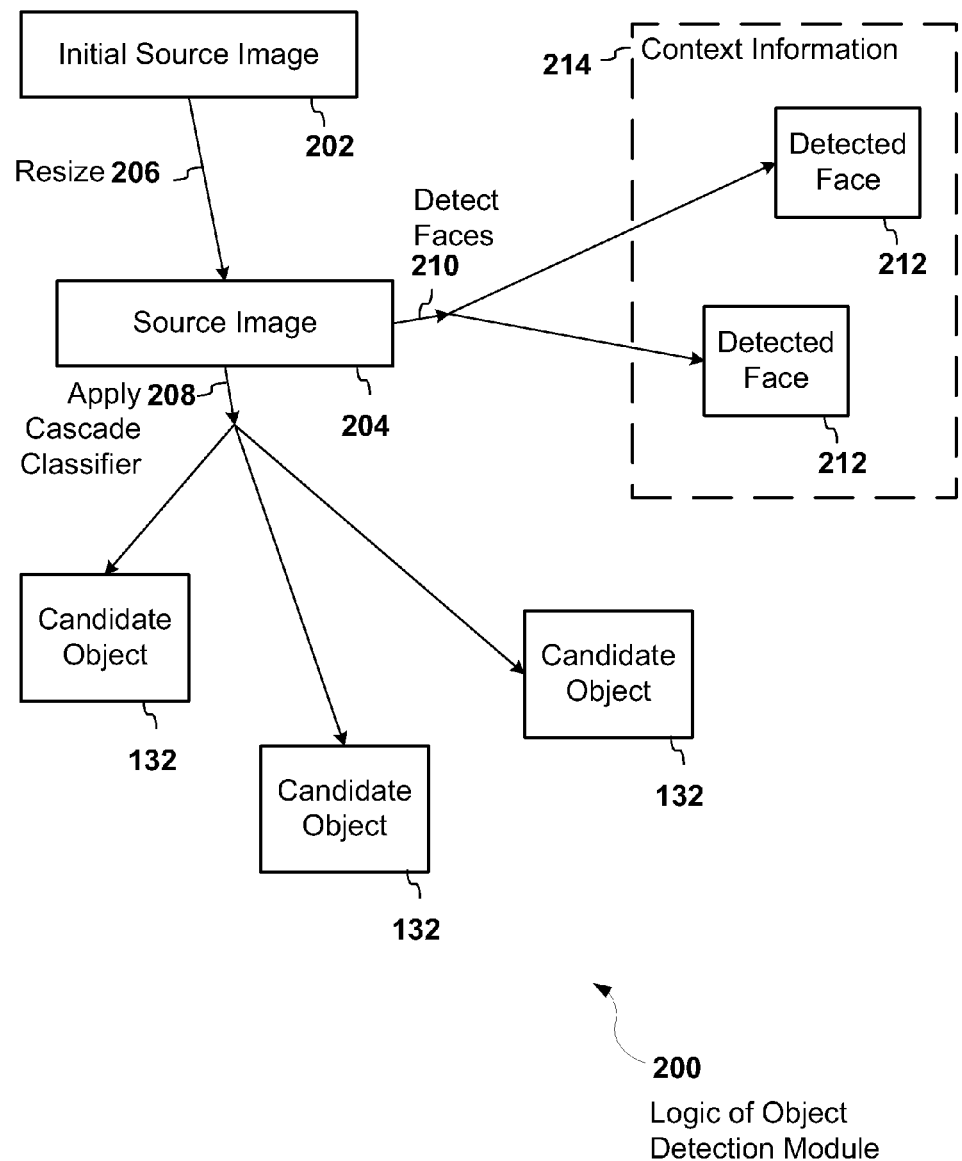
FIG. 2 illustrates the logic flow of an object detection module.

When scanning the source images 120 for the object type 124, the object detection module 126 of the scan engine 114 may locate one or more candidate objects 132 in the source images 120. FIG. 2 illustrates an example logic flow 200 of the object detection module 126.

The object detection module 126 may resize (206) an initial source image 202 to obtain a source image 204 that has a target size. The target size may be selected to be large enough, by pixel standards, to detect and verify the predetermined object type 124 or types, but not so large that detecting and verifying objects exceeds a threshold amount of time. An example of the target size may be approximately 2000 horizontal pixels and 1300 vertical pixels. The target size may depend on factors such as the speed of the processor 110, characteristics of the object type 124, and/or the number and variety of object types that the scan engine 114 searches for.

Resizing (206) the initial source image 202 may improve the speed by which the detected objects 122 may be recognized, while only incurring a small loss of accuracy in recognizing objects. Nevertheless, the source image 204 may have any size and the initial source image 202 need not be resized.

To locate the candidate objects 132, the object detection module 126 may apply (208) the cascade classifier 130 to the source image 204. The cascade classifier 130 may be an XML (eXended Markup Language) cascade, for example.

The type of the cascade classifier 130 applied may be any type of cascade classifier. For example, the cascade classifier 130 may be a Haar-like feature classifier, a local binary pattern (LBP) feature classifier, a histogram of gradient (HOG) feature classifier, or any other type of cascade classifier. Each type of cascade classifier may implement a corresponding detection algorithm. Examples of the detection algorithm may include Haar, LBP, HOG, or any other type of cascade algorithm.

The type of the cascade classifier 130 that is applied to the source image 204 may vary depending on the object type 124. Each type of object may be identified more accurately with one type of cascade classifier than another. For example, if the predetermined object type 124 is a type of object that includes lettering, then a LBP feature classifier may be associated with the predetermined object type 124 in the memory 112.

Figure 6:
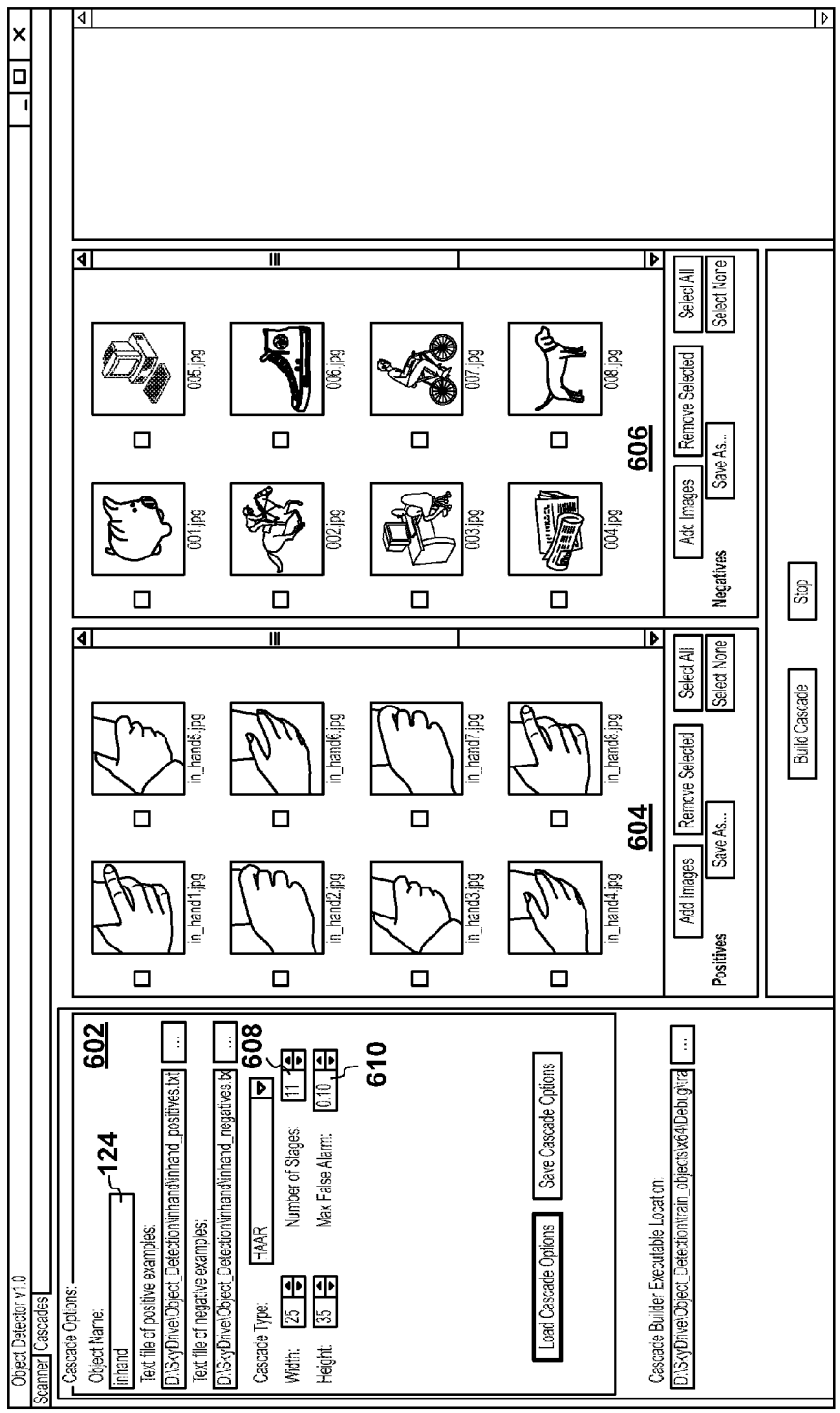
FIG. 6 illustrates a graphical user interface for building cascade classifiers.

A user may select and/or associate a selected cascade classifier 130 with the predetermined object type 124 in the memory 112. The scan engine GUI module 116 may generate a GUI, as illustrated in FIG. 6 for example, for selecting and/or associating the cascade classifier 130 with the predetermined object type 124. Alternatively or in addition, the cascade classifier 130 may be customized with the GUI generated by the scan engine GUI module 116 as illustrated in FIG. 6.

Figure 7:
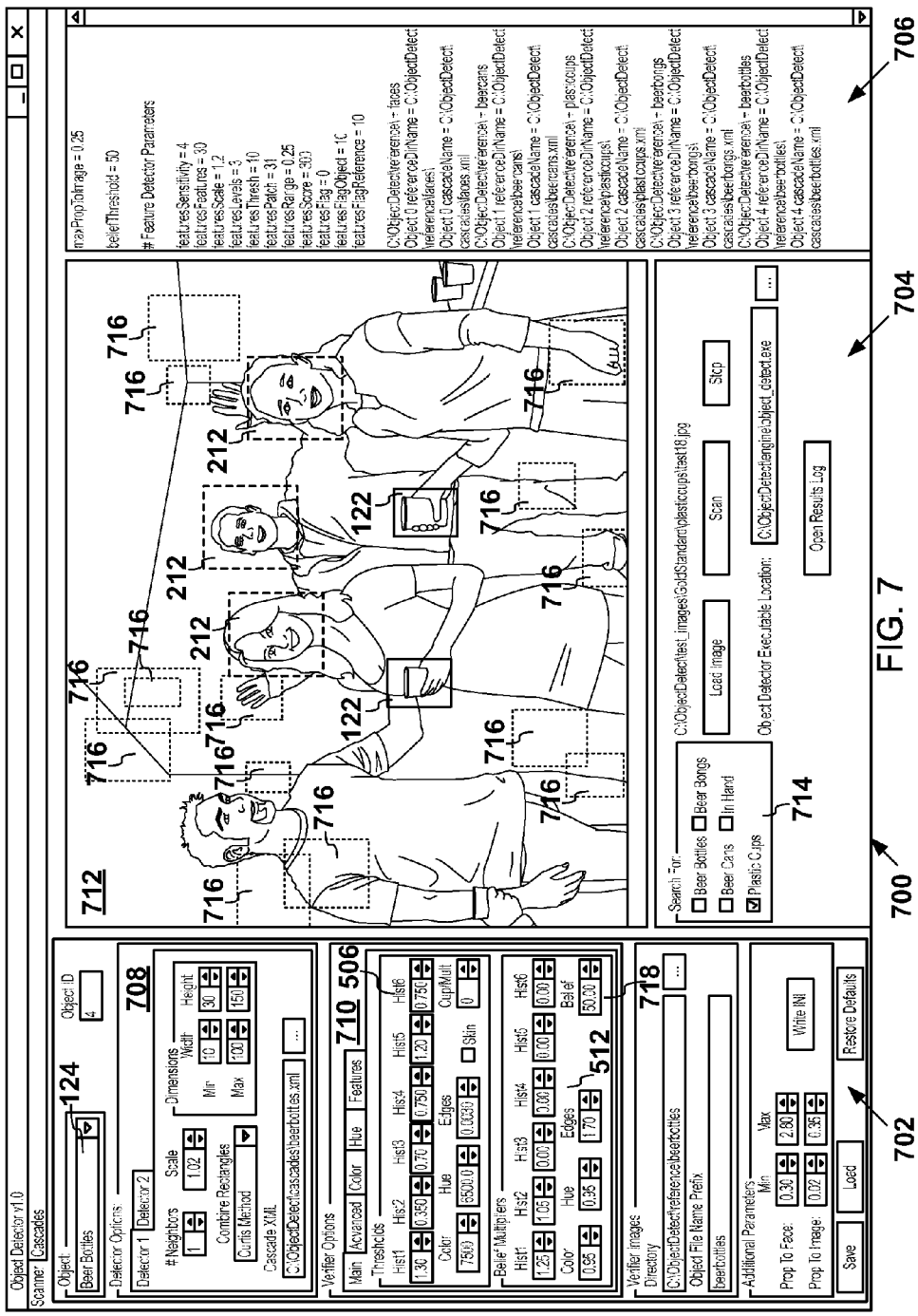
FIG. 7 illustrates a graphical user interface for testing and adjusting parameters of an object detection module and a verification module.

The behavior of detection algorithm of the object detection module 126 may be controlled by parameters. The parameters may be adjusted and passed to the object detection module 126. The scan engine GUI module 116 may generate a GUI, as illustrated in FIG. 7 for example, for adjusting the parameters passed to the object detection module 126.

Customizing the cascade classifier 130, associating the cascade classifier 130 with the predetermined object type 124, and/or adjusting the parameters to the object detection module 126 may be performed prior to the object detection module 126 searching the source image 204 for the predetermined object type 124. Alternatively or in addition, such action or actions may be performed while the object detection module 126 searches the source image 204 for the predetermined object type 124. Alternatively or in addition, such action or actions may be performed after the object detection module 126 searches the source image 204.

The object detection module 126 may store a size and/or a location of each of the candidate objects 132. For example, Cartesian coordinates, measured in pixels, of each of the candidate objects 132 may be stored in the memory 112. The height and width, for example in pixels, of each of the detected faces 212 may be stored in the memory 112.

In addition to locating the candidate objects 132 in the source image 204, the object detection module 126 may detect (210) faces 212 in the source image 204. The object detection module 126 may, for example, apply an XML cascade to the source image 204 thereby detecting any faces 212 in the source image 204. For example the XML cascade may evaluate the source image 204 for Haar-like features.

The object detection module 126 may store a location of each of the detected faces 212. For example, Cartesian coordinates, measured in pixels, of each of the detected faces 212 may be stored in the memory 112. Alternatively or in addition, a size of each of the detected faces 212 may be stored. For example, the height and width in pixels of each of the detected faces 212 may be stored in the memory 112. In some examples, the object detection module 126 may determine an average size of the detected faces 212.

The size, average size, and/or location of the detected faces 212 may provide context information 214 for the candidate objects 132. The verification module 128 may use the context information 214 to verify that the candidate objects 132 are objects of the predetermined object type 124. In particular, as described later below, the verification module 128 may compare the size, the average size, and/or the location of the detected faces 212 with a relative expected size and/or a relative expected location of an object of the predetermined object type 124. Alternatively or in addition, the verification module 128 may use the size, average size, and/or location of the detected faces 212 to adjust a likelihood that each of the candidate objects 132 is of the predetermined object type based on a likelihood that an object of the predetermined object type 124 may overlap any of the detected faces 212.

In addition to the context based verification tests 136, verification module 128 may perform the reference image based verification tests 134. Verification of the candidate objects 132 that are detected with the cascade classifier 130 may improve the accuracy of detecting objects over detecting objects with just the cascade classifier 130 alone. When objects are detected with just a cascade classifier—in other words, without verifying the candidate objects 132 as described herein—the cascade classifier 130 may be configured to achieve a suitable balance of true positives, false positives, and false negatives. As a result of achieving that balance, undetected objects that may have otherwise been detected are eliminated from further consideration.

By performing the verification tests 134 and/or 136, the cascade classifier 130 may be configured to identify more false positives than in the absence of performing the verification tests 134 and/or 136. Accordingly, the overall accuracy in identifying the detected objects 122 may be improved.

Figure 3:
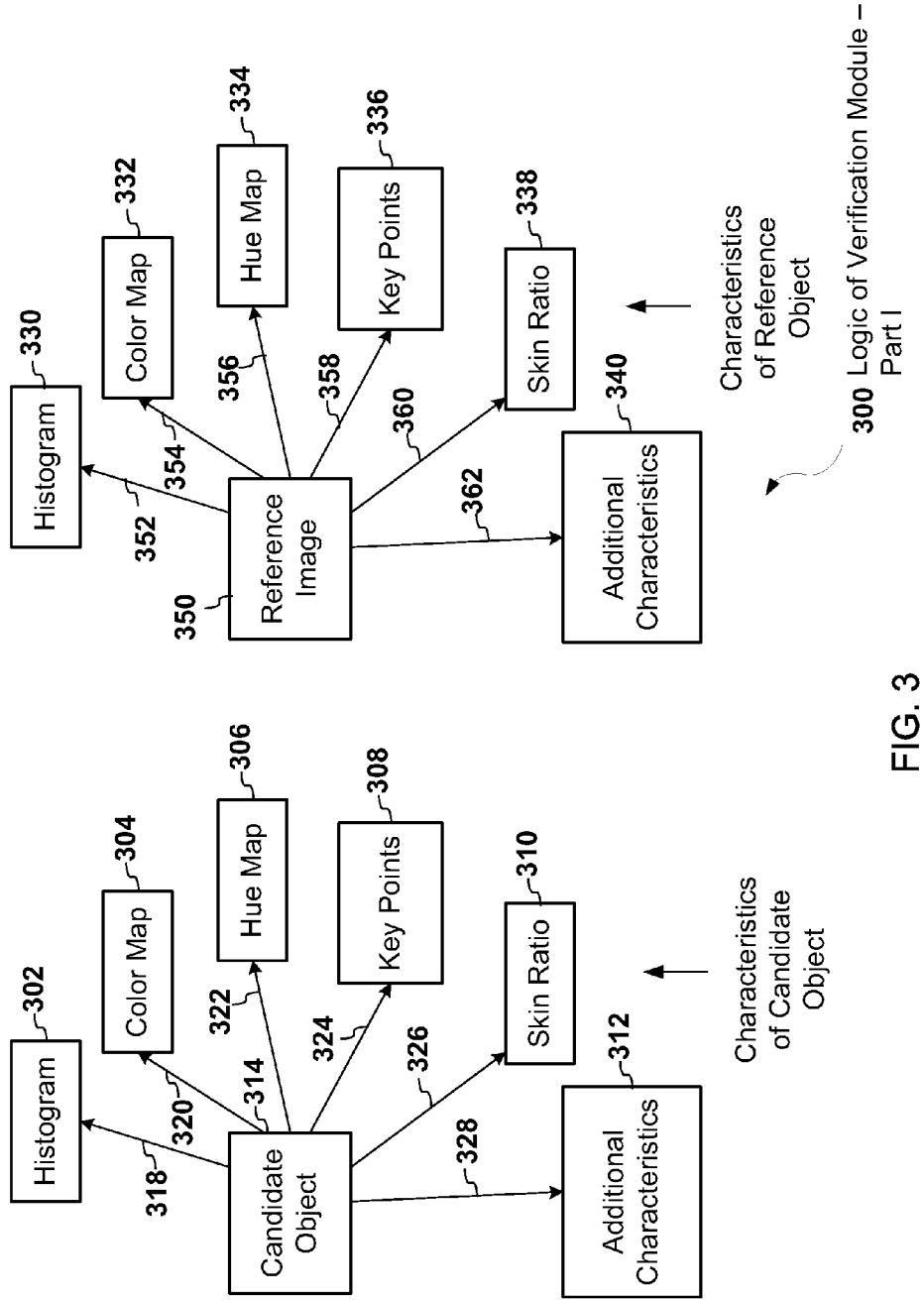
FIG. 3 illustrates a first part of the logic flow of a verification module.

FIG. 3 illustrates a flow diagram of an example of part of the logic 300 of the verification module 128. For each of the candidate objects 132, characteristics 302, 304, 306, 308, 310, and/or 312 of a candidate object 314 may be generated (318, 320, 322, 324, 326, and/or 328).

For example, a histogram 302 of the candidate object 314 may be generated (318). The histogram 302 may represent variations in shading and/or coloration. The histogram 302 may, for example, include a map of shading and/or color values arranged in "bins." Each of the bins may represent a subset of a range of such values.

The histogram 320 may provide a basis for finding similarities and/or differences between two objects. For example, the histogram 302 of a banana may match the histogram 302 of a lemon because the number of pixels that are shades representing yellow may be comparable for both objects, even though other aspects of the objects, such as their the shapes, are different from each other. The histogram 302 of the candidate object 314 may be subsequently compared with a histogram 330 of each of the reference images 140, such as with the histogram 302 of reference image 350 illustrated in FIG. 3. The histogram 320 may include multiple histograms because multiple types of histograms may be generated. Each type of histogram may represent properties of an image that are different than properties represented by the other types of histograms included in the histogram 320. For example, the histogram 320 may include a histogram of predetermined portions of color data and a histogram of grayscale shades.

A color map 304 of color data of the candidate object 314 may be generated (320). The color map 304 may be a pixel by pixel representation of the image in red-green-blue (RGB) color space. The color map 304 of the candidate object 314 may be subsequently compared with a color map 332 of one or more of the reference images 140.

A hue map 306 of hue data of the candidate object 314 may be generated (322). The hue map 306 may be a pixel by pixel representation of the candidate object 314 in hue, saturation, and value (HSV) color space. Alternatively or in addition, the hue map 306 may be a representation of the candidate object 314 in a HSL (hue, saturation, and lightness) color space, a HSI (hue, saturation, and intensity) color space, and/or any other color space. The hue map 306 of the candidate object 314 may be subsequently compared with a hue map 334 of one or more of the reference images 140.

Key points 308 of the candidate object 314 may be identified (324). The key points 308 may represent significant features within the candidate object 314, such as corners and areas of contrast. Such features are known as key points. The key points 308 may include pixel information from around such features. For example, the key points 308 may include descriptors that include the pixel information. The key points 308 of the candidate object 314 may be subsequently compared with key points 336 of one or more of the reference images 140.

A percentage 310 of the candidate object 314 that contains hue, saturation, and value data that are within a range that represents skin tones may be determined (326). For example, if fifty percent of the candidate object 314 contains hue, saturation and value data within the range that represents skin tones, then half of the candidate object 314 may be skin. The percentage 310 may also be represented as and/or referred to as a skin ratio 310.

The skin ratio 310 of the candidate object 314 may be subsequently compared with a skin ratio 338 of one or more of the reference images 140. The range of hue, saturation, and value data that represents skin tones may be determined prior to detecting any of the candidate objects 132.

Alternatively or in addition, any other characteristics 312 of the candidate object 314 that may be useful for comparison with the reference images 140 or that may provide context for the candidate object 314 may be determined and/or stored (328). Examples of such characteristics 312 may include an average color or hue of the candidate object 314, a location of the candidate object 314 relative to any of the detected faces 212, and/or any other characteristic of the candidate object 314. The additional characteristics 312 of the candidate object 314 may be compared with corresponding additional characteristics 340 of the reference image 350.

The histogram 330, the color map 332, the hue map 334, the key points 336, the skin ratio 338, and/or the additional characteristics 340 may be generated (352, 354, 356, 358, 360, and/or 362) for each of the reference images 140.

Each of the reference images 140 may be an image of an object that is confirmed to be of the predetermined object type 124. The reference images 140 may be customized to improve the accuracy of the verification module 128. For example, the reference images 140 may be added to, deleted from, or adjusted at any time. As described in more detail below, the characteristics 330, 332, 334, 336, 338, and/or 340 of each of the reference images 140 may be used in the verification tests 134 and/or 136 for comparison with the candidate objects 132.

Figure 4:
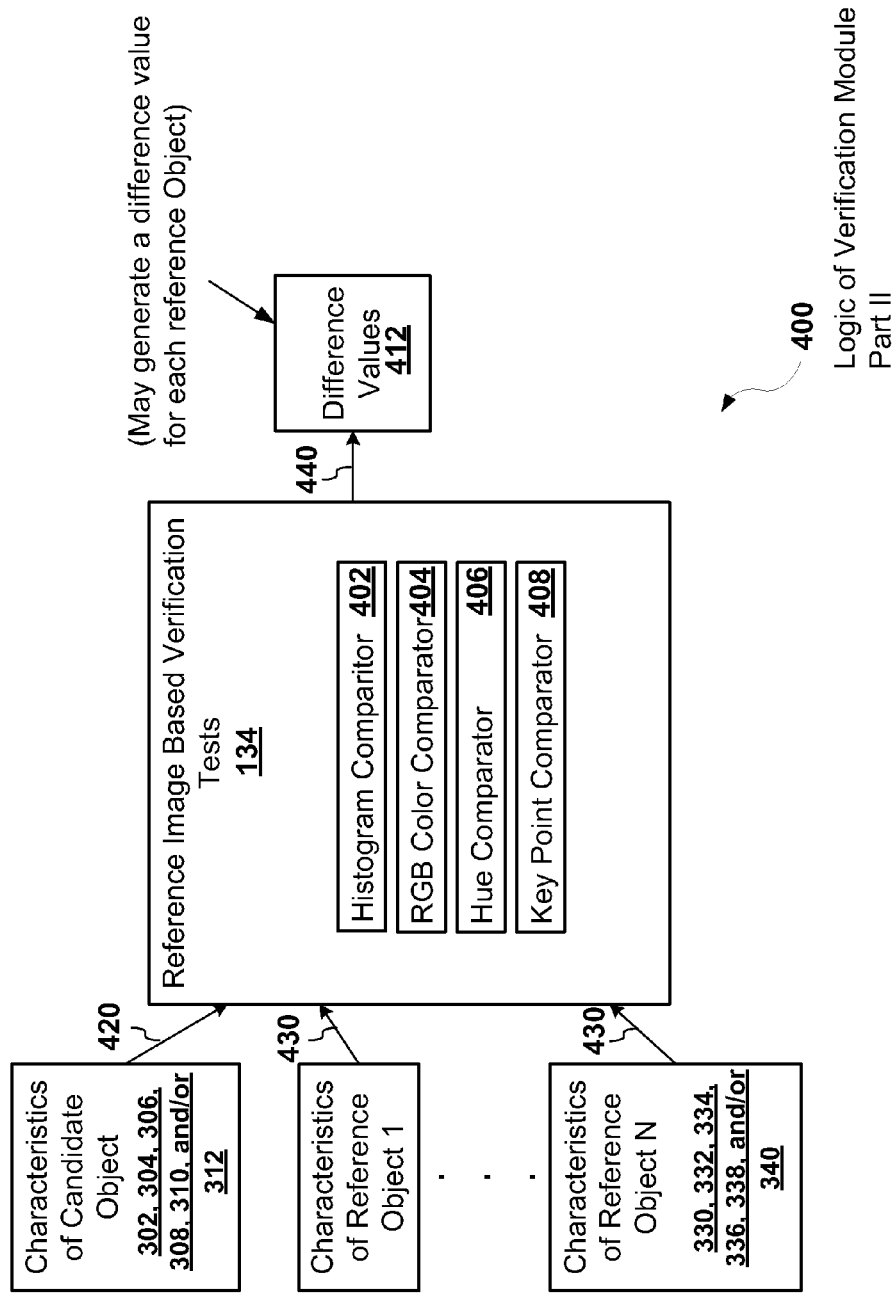
FIG. 4 illustrates a second part of the logic flow of a verification module.

FIG. 4 illustrates a flow diagram of an example of part of the logic 400 of the verification module 128. In particular, FIG. 4 illustrates a flow diagram of the logic of the reference image based verification tests 134. For each predetermined object type 124 that the scan engine 114 attempts to locate in the source image 204, a set of the candidate objects 132 of that type 124 may be found by the object detection module 126. For each of the candidate objects 132 found, a series of comparisons may be made to each of reference images 140 of the predetermined object type 124. The comparisons may be performed by the reference image based verification tests 134.

For example, the reference image based verification tests 134 may include a histogram comparator 402, an RGB color comparator 404, a hue comparator 406, and/or a key point comparator 408. The reference image based verification tests 134 may include additional, fewer, or different comparators than illustrated in FIG. 4.

The comparators 402, 404, 406, and/or 408 may be provided (420) with one or more of the characteristics 302, 304, 306, 308, 310, and/or 312 of the candidate object 314. In addition, the comparators 402, 404, 406, 408 and/or 410 may be provided (430) with one or more of the characteristics 330, 332, 334, 336, 338, and/or 340 of each of the reference images 140. As a result of each comparison of the candidate object 314 with the corresponding reference image 350, the comparators 402, 404, 406, and/or 408 may generate (440) a numerical score. The numerical scores may be referred to as difference values 412. Each of the difference values 412 may represent a difference between the candidate object 314 and the corresponding reference image 350. Equivalently, each of the difference values 412 may represent a similarity between the candidate object 314 and the corresponding reference image 350.

For example, the histogram comparator 402 may compare the histogram 302 of the candidate object 314 to the histogram 330 of each reference image 350 using one or more algorithms. The histogram comparator 402 may generate, from each comparison, a corresponding one of the difference values 412 for each algorithm that the histogram comparator 402 applies. The algorithm and/or algorithms may include any type of histogram comparison algorithm. For example the histogram comparator 402 may implement a correlation metric, chi-square metric, intersection metric, and/or Bhattacharyya distance metric computation.

The RGB color comparator 404 may compare the color map 304 of the candidate object 314 to the color map 332 of each reference image 350. The RBG color comparator 404 may generate, for reference image 350, a respective one of the difference values 412 based on the comparison of the color maps 304 and 332. The RGB color comparator 404 may compare the color maps 304 and 332 using one or more types of comparisons. One of the types of RGB color comparisons may include a grayscale conversion comparison, for example. The candidate object 314 and the reference image 350 may be converted to grayscale images. For each pixel, the grayscale value (0-256) of the pixel in the candidate object 314 may be subtracted from the grayscale value of the reference image 350, and the difference may be squared. The sum of the squared values for the pixels may represent one the difference values 412 generated by the RGB color comparator 404. Alternatively or in addition, the types of RGB color comparisons may include a peak color difference comparison. For example, each pixel in the candidate object 314 may be compared to each pixel in the reference image 350 in each color channel (Red, Green, Blue) separately. The color channel having the greatest difference between the pixel in the candidate object 314 and the pixel in the reference image 350 may be determined. The difference between the pixel in the candidate object 314 and the pixel in the reference image 350 in the determined color channel may be squared a represent a peak value. The sum of the peak values may represent one of the difference values 412 generated by the RGB color comparator 404. Alternatively or in addition, the types of RGB comparisons may include a sum of squares comparison. Each pixel in the candidate object 314 may be compared to each pixel in the reference image in each color channel (Red, Green, Blue) separately. A square of the difference in each channel may be determined. One of the difference values 412 generated by the RGB color comparator 404 may be a sum of the squares for each of the channels for all of the pixels.

The hue comparator 406 may compare the hue map 334 of the candidate object 314 to the hue map 334 of the reference image 350. The hue comparator 406 may compare the candidate object 314 with each reference image 350 in the HSV color space, the HSL color space, the HSI color space and/or any other color space. The hue comparator 406 may generate, for each comparison, a respective one of the difference values 412. The hue comparator 406 may compare the hue map 334 of the candidate object 314 to the hue map 334 of the reference image 350 using one or more types of comparisons. The comparison or comparisons may include comparisons similar to the RGB color comparisons except that the color channels may be hue, saturation, and value (HSV); hue, saturation, and lightness (HSL); hue, saturation, and intensity (HSI); and/or any other color channels or combinations thereof.

The key point comparator 408 may compare the key points 308 of the candidate object 314 with the key points 336 of each reference image 350. For example, descriptors in the key points 308 and 336 may be compared with each other. The key point comparator 408 may generate, for each comparison, a respective one of the difference values 412. The key points 336 may be determined using the FAST (Features from Accelerated Segment Test) feature detecting algorithm or any other feature detecting algorithm, such as difference of Gaussians (DoG). The descriptors for each key point may be determined using an ORB (oriented BRIEF) keypoint detector or any other type of detector. The descriptors may represent a grid of pixel information surrounding each of the key points 336, where the grid of pixel information may be configurable. A brute force matcher may compare each descriptor for the key points 336 in the candidate object 314 to each descriptor of the key points 336 in the reference image 350. A brute force matcher is a matcher that does not apply a specialized algorithm to speed up the matching process. Alternatively, any other type of matcher may be used. The brute force matcher may return a location of a key point in the reference image 350 that best matches each corresponding key point in the candidate object 314, as well as a corresponding numerical score. The numerical score may be the sum of the differences between the matching key point descriptors. The resulting data may be parsed to identify one singular best match of each of the key points 308 in the candidate object 314 with a corresponding one of the key points 336 in the reference image 350. In other words, none of the key points of the candidate object 314 is a best match with multiple key points 336 of the reference image 350. The data may be further parsed to remove matches in which the numerical score of the respective match falls below a threshold score. The data may be further parsed to remove matches that fail to meet a Cartesian y-range limit. In other words, each of the matching descriptors are to include points that each match in the same relative Y position in the candidate object 314 and reference image 350. The number of matching key points that meet such criteria may be divided by the number of pixels in the candidate object 314, resulting in the key point comparator score. The variables used in this comparator may be adjustable from the GUI 146 generated by the scan engine GUI module (116).

Figure 5:
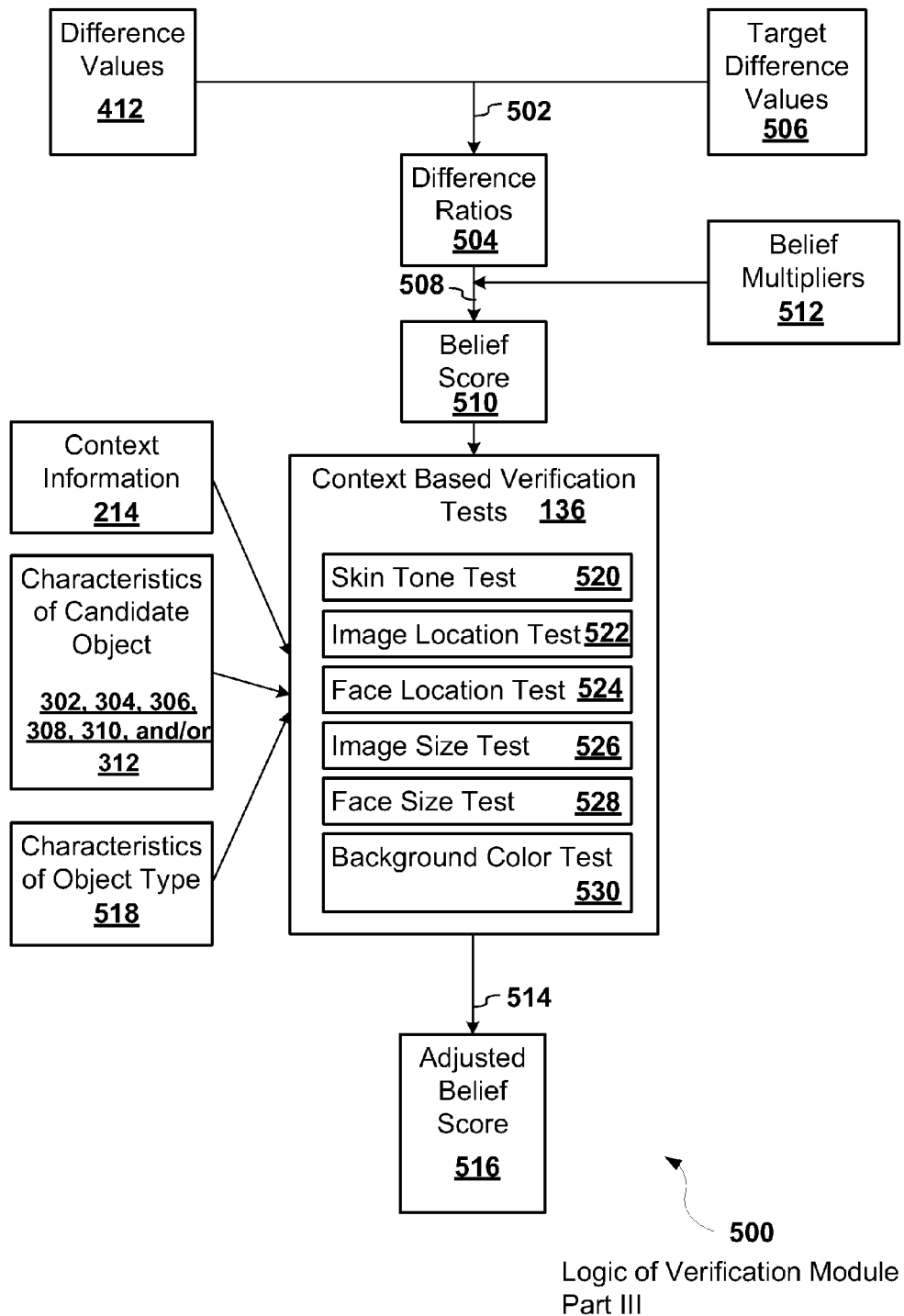
FIG. 5 illustrates a third part of the logic flow a verification module.

FIG. 5 illustrates a flow diagram of an example of part of the logic 500 of the verification module 128. In particular, FIG. 5 illustrates a flow diagram of the logic of the scoring module 138 and the logic of the context based verification tests 136.

The scoring module 138 may determine (502) difference ratios 504 based on the difference values 412 and on target difference values 506. Each one of the target difference values 506 may be an expected difference value for a corresponding one of the characteristics 302, 304, 306, 308, 310, and/or 312 of any reference image and any candidate image that actually depicts an object of the predetermined object type 124. In some examples, the expected difference value may be a minimum threshold difference value needed for the candidate object 314 to match the reference image 350 for the corresponding one of the characteristics 302, 304, 306, 308, 310, and/or 312.

The difference ratio 504 for the respective one of the characteristics, c, may be determined as: [(difference value$_c$−target difference$_c$)/target difference$_c$]. Alternatively, the difference ratio 504 may be determined based on any algorithm in which the greater negative difference between each of the difference values 412 and the corresponding one of the target difference values 506, the greater similarity between the candidate object 314 and the reference image 350 with respect to the corresponding characteristic. Conversely, the greater positive difference between each of the difference values 412 and the corresponding one of the target difference values 506, the greater difference between the candidate object 314 and the reference image 350 with respect to the corresponding characteristic.

The formula for the difference ratio 504 for the respective one of the characteristics, c, may vary depending on whether the difference score is preferably lower than the target difference or preferably greater than the target difference. If the characteristic, c, is desired to be greater than the target difference for a match, then the formula provided above may apply. However, if the characteristic, c, is desired to be lower than the target difference, then the formula [(target difference$_c$−difference value$_c$)/target difference$_c$] may apply. The determination of the difference ratios 504 may standardize each test to a similar range of ratios.

Consider an example where the target difference value 506 for the histogram 302 characteristic is 10, and a greater value is more desirable than a lesser value (in other words, the larger the difference value, the better the match). If the difference value for the histogram 302 of candidate object 315 is 15, then the difference ratio may be (15−10)/10, or 0.5, which is a positive number that positively influences the belief score 510 toward acceptance, particularly after multiplication with a corresponding one of the belief multipliers 512. On the other hand, if the difference value for the histogram 302 of the candidate object is 5, then the difference ratio may be (5−10)/10, or −0.5, which is a negative number that will negatively influence the belief score 510, particularly after multiplication with the corresponding one of the belief multipliers 512. Alternatively, if a lesser difference value is more desirable than a greater value for the characteristic, c, then the first difference ratio may be (10−15)/10, or −0.5, and the second difference ratio may be (10−5)/10, or 0.5. The sign of the difference ratios are now reversed and have the opposite effect on the belief score 510.

In addition to determining the difference ratios 504, the scoring module 138 may determine (508) a belief score 510 based on the difference ratios 504 and on belief multipliers 512. The belief score 510 may indicate a likelihood or probability that the candidate object 314 matches the reference image 350.

The scoring module 138 may determine the belief score 510 based on an algorithm in which the belief score 510 falls into a suitable range. The suitable range may be a range in which a belief score of 50 represents a 50 percent chance that candidate object 314 matches the reference image 350, a belief score of 100 represents an almost 100 percent chance of a match, and a score of 0 (or less) represents an almost zero percent chance of a match. Each of the difference ratios 504 may be applied to the belief score 510. The amount of each of the difference ratios 504 that is applied is based on adjustable multipliers that determine an importance of each characteristic for the predetermined object type 124. The adjustable multipliers are the belief multipliers 512.

In some examples, the scoring module 138 may determine (508) the belief score 510 as a sum of weighted difference ratios (the difference ratios 504 weighted by the belief multipliers 512), the sum then multiplied by a scalar, such as 20, and added to a constant, such as 50 percent. In other words, the belief score 510 may be determined according to the following:

$$\left(\sum_{c=1}^{N} M_c \cdot r_c\right) * S + K$$

where $r_{cc}$ is the difference ratio for a characteristic, c; N is the number of the characteristics that are applied to the belief score 510; $M_c$ is the belief multiplier for the characteristic, c; S is the scalar, and K is the constant. Alternatively, the belief score 510 may be determined using other algorithms.

The belief multipliers 512 configured for some predetermined object types may differ from the belief multipliers 512 configured for other predetermined object types. For example, a first set of object types may be more accurately matched using the key points 308 characteristic, while a second set of object types may be more accurately matched using the color map 304 characteristic. Accordingly, the belief multiplier for the key points 308 characteristic that is associated with the first set of object types may be higher than the belief multiplier for the key points 308 characteristic that is associated with the second set of object types.

Figure 8:
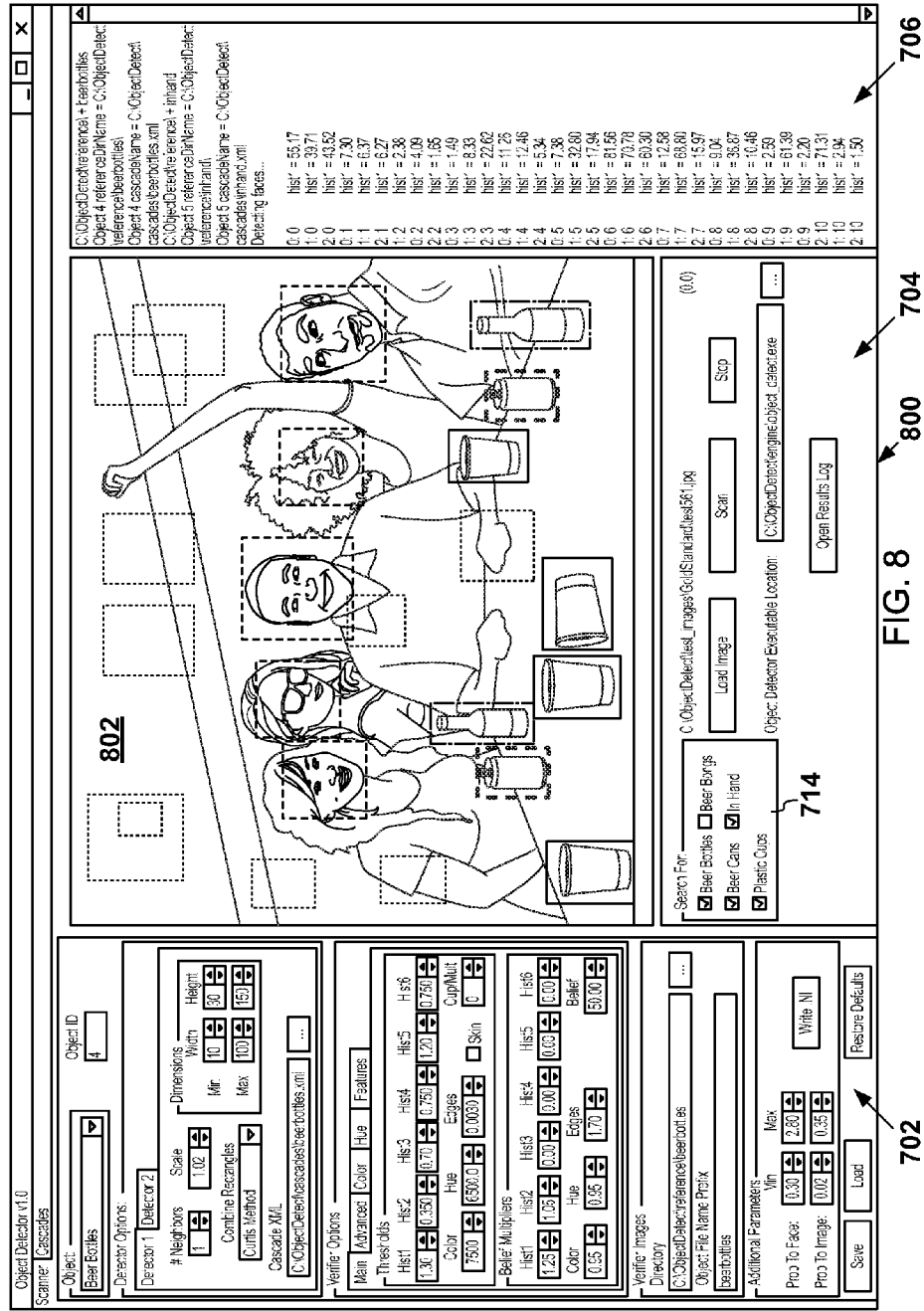
FIG. 8 illustrates a graphical user interface for testing and adjusting parameters of an object detection module and a verification module in a search for multiple object types.

For any characteristic, a positive difference ratio may indicate that the difference value is outside the bound of the target difference, which may negatively affect the belief score 510. Conversely, a negative difference ratio may indicate that the difference value is inside the bound of the target difference, which may positively affect the belief score 510. The greater the difference ratio, the greater the effect on the belief score 510. As illustrated in FIGS. 7 and 8, the target difference values 506 may be adjustable and tuned by a user with the GUI 146. The characteristics for some object types in some examples may require strict target differences in certain characteristics, and more lenient differences in other examples. Like the target differences, the belief multipliers 512 may be adjusted and tested from within the GUI 146 for the predetermined object type 124.

Additional tests, such as the context based verification tests 136, may be performed that adjust the belief score 510. Based on the context information 214, the characteristics 302, 304, 306, 308, 310, and/or 312 of the candidate object 314, and/or characteristics of the predetermined object type 124, the context based verification tests 136 may generate (514) an adjusted belief score 516.

The context based verification tests 136 may include a skin tone test 520, an image location test 522, a face location test 524, an image size test 526, a face size test 526, and/or a background color test 530. The context based verification tests 136 may include fewer, additional, or different tests.

The context information 214 used by the context based verification tests 136 may include any information that may provide context for the candidate objects 132. For example, the context information 214 may include the percentage of skin tones in the candidate object 314, a location of the candidate object 314 within the source image 204, a location of the candidate object 314 relative to one or more of the detected faces 212, the size of the candidate object relative to one or more of the detected faces 212, the size of the candidate object relative to the size of the source image 204 and/or any other information related to the context of the candidate object 314, such as text that is associated with the source image 204, such as a post, or a tag associated with the source image 204.

The skin tone test 520 may determine the percentage of the candidate object 314 that has color and/or hue values that are consistent with skin tones. The determined percentage may be compared to a predetermined minimum expected percentage and/or a predetermined maximum expected percentage. The predetermined minimum expected percentage and the predetermined maximum expected percentage may be configurable. The skin tones may be configurable. If the determined percentage is in a range between the predetermined minimum expected percentage and the predetermined maximum expected percentage, then the skin tone test 520 may not modify the belief score 510, for example. On the other hand, if the determined percentage is less than the predetermined minimum expected percentage or greater than the predetermined maximum expected percentage, then the skin tone test 520 may determine a difference between the determined percentage and the closest of the predetermined minimum expected percentage or the predetermined maximum expected percentage. The difference may be multiplied by an adjustable multiplier to further emphasize the result, on a per candidate object basis.

For example, the expected percentage range of skin tones for a candidate object 314 of type in-hand may be set at 50-80%. In other words, the predetermined minimum expected percentage is 50%, and the predetermined maximum expected percentage is 80%. If only 10% of the pixels in the candidate object 314 are determined to be skin tones, then the difference in percentage points between 10% and 50% (40%) is multiplied by a skin tone multiplier resulting in a negative value that lowers the belief score 510. Similarly, if 90% of the pixels in the candidate object 314 are determined to be skin tones, then the difference in percentage points between 90% and 80% (10%) is multiplied by the skin tone multiplier resulting in a negative value that harms the belief score 510. Alternatively, if the skin percentage range of the candidate object 314 falls within the predetermined percentage range, then the belief score 510 may be unaffected by the skin tone test 520.

The image location test 522 may verify that the location of the candidate object 314 within the source image 204 is within a predefined area. The predetermined area may be typical for an object of the predetermined object type 124. For example, beer cans often appear near the center to bottom half of an image, because the beer cans are most often on a table or are being held by a person below eye level. Accordingly, the center of the source image 204 may be a baseline. As the location of the candidate object 314 increases on the Y-axis from the baseline (in other words, as the candidate object 310 is located further towards the top of the source image 204 relative to the baseline), the belief score 510 may decrease. For example, the image location test 522 may reduce the belief score 510 by a multiplicative product of an adjustable belief multiplier and the distance that the candidate object 314 is from the baseline.

The face location test 524 may verify that the location of the candidate object 314 relative to one or more of the detected faces 212 is appropriate for the predetermined object type. In one such example, many types of objects should not overlap any of the detected faces 212. A beer can, for example, is relatively unlikely to overlap a face in a picture. Accordingly, if the candidate object 314 is potentially a beer can and yet the candidate object 314 overlaps any of the detected faces 212, then the face location test 524 may decrease the belief score 510 by a predetermined amount.

The image size test 526 may verify that the size of the candidate object 314 relative to the size of the source image 204 is within a predetermined range. The predetermined range may be a range that is typical for an object of the predetermined object type 124. For example, a relative size of a beer may typically be less than thirty percent of the source image 204 or more than five percent of the source image 204. In some examples, the candidate objects 132 that do not fall within the predetermined size range may be eliminated from consideration early in the verification process in order to reduce computational time.

The face size test 526 may verify that the size of the candidate object 314 relative to the size of the detected faces 212 in the source image 204 is within a predetermined range. The predetermined range may be typical for objects of the predetermined object type 124. For example, a beer can in an image is unlikely to be twice the size of a human head or a tenth the size of a human head. The candidate objects 132 that fall outside established (and adjustable) ranges compared to the average face size in the source image 204 may be eliminated from further consideration.

The background color test 530 may compare the average color of the candidate object 314 with background colors of the source image 204. For example, objects that may be transparent may more closely match the background colors of the source image 204 than translucent objects. The background color test 530 may verify that the average color of the candidate object 314 matches the background colors of the source image 204 to a degree that is typical for objects of the predetermined object type 124. The background color test 530 may compare the average color of the candidate object 314 with the background colors of the source image 204. For example, the candidate object 314 for the predetermined object type, "plastic cup," may be part of a larger background object, such as a red fire engine. The average color (in any color space) of the candidate object 314 may be determined. The background color test 530 may determine a percentage of the entire source image 204 that contains the average color of the candidate object 314 and/or similar color values within an adjustable range. The percentage of the source image 204 that the candidate object 314 occupies may be compared to the percentage of the entire source image 204 that contains the range of similar color value. If the source image 204 contains a high percentage of a similar color, a similarly colored background object (such as a red fire truck) may be present in the source image 204. The presence of the background object that is similar in color to the candidate object 314 may indicate a lower likelihood that the candidate object 314 is of the predetermined object type 124. The lower likelihood is due to the candidate object 314 being more likely to be a section of the background object. Accordingly, the background color test 530 may reduce the belief score 510 if the source image 204 contains a high percentage of a color similar to the color of the candidate object 314. Alternatively, if the source image 204 contains a low percentage of a color similar to the color of the candidate object 314, then the background color test 530 may not modify the belief score 510.

As described above, the context information 214 may include information about the faces 212 detected by the object detection module 126. The verification module 128 may further limit the information about the detected faces 212 to information about faces that are also verified by the verification module 128. For example, the verification module 128 may verify the detected faces 212 by performing the reference image based verification tests 134 or any other type of test, such as a biometric test. The detected faces 212 may be limited to the faces that meet or exceed a predetermined belief level, such as a fifty percent likelihood that the detected face 212 is actually a face.

In some examples, the context information 214 may include metadata, such as geo-location data, associated with the source image 204. A camera, or a device that includes the camera, that captured the source image 204 may tag the source image 204 with geo-location data indicating a physical location where the source image 204 was taken. The scan engine 114 may extract the geo-location data and determine a likelihood that an object of the predetermined object type 124 was at the physical location where the source image 204 was captured. The context based verification tests 136 may adjust the belief score 510 according to the likelihood that an object of the predetermined object type 124 was at the physical location where the source image 204 was captured. For example, the belief score 510 may be increased if the predetermined object type 124 is a beer bottle and the physical location is determined to be a bar.

The context information 214 may include a capture date. The capture date may indicate a date on which the source image 204 was taken. The date may include a time of day. The date may include only a time of day in some examples. The capture date may be extracted from the metadata associated with source image 204. The metadata may be added by the camera or any other device. For example, the metadata may be a date on which the source image 204 was posted in the social networking service 102.

The context based verification tests 136 may adjust the belief score 510 according to the likelihood that an object of the predetermined object type 124 is present on the capture date. For example, if the predetermined object type 124 is a Christmas tree, then the candidate objects 132 are more likely to be a Christmas tree if the capture date of the source image 204 is on Christmas, or within a date range that includes Christmas. As a result, the context based verification tests 136 may increase the belief scores of the candidate objects 132 when searching for a Christmas tree and the capture date of the source image 204 is on Christmas or within a date range that includes Christmas.

The context information 214 may include information about one or more images associated with the source image 204. For example, the images associated with the source image 204 may be images captured within a predetermined time of the source image 204. Alternatively or in addition, the images associated with the source image 204 may be images included in one photo album in the social networking service 102. The inclusion of the source image 204 in a photo album that also includes an image depicting one or more objects associated with the predetermined object type 124 may increase the likelihood that the candidate objects 132 are objects of the predetermined object type 124. Alternatively or in addition, the images associated with the source image 204 may be images having a capture date within a predetermined amount of time from the capture dates of the associated images.

The context based verification tests 136 may adjust the belief score 510 based on an amount of time between the capture date of the source image 204 and the capture date of an image that includes an object of the predetermine object type 124 or information associated with the predetermined object type 124. In one such example, the scan engine 114 detects an object of the predetermined object type 124, such as a basketball, in an associated image with a relatively high belief score. The image was captured within close time proximity to (or within a predetermined amount of time of) the source image 204. The associated image may be associated with the source image 204 by being in same photo album as the source image 204. As a result, the context based verification tests 136 may increase the belief scores for the candidate objects 132 in the source image 204 when the scan engine searches the source image 204 for the predetermined object type 124.

The context information 214 may include an identity of one or more people depicted in the source image 204 and/or personally identifiable information of the people depicted in the source image 204. For example, the scan engine 114 may search for the predetermined object type 124, such as a hand bag, in the source image 204 that depicts or is otherwise associated with individual A. Individual A may be associated with the source image 204 through a social tag and/or by facial recognition processing of the source image 204. A database may store an indication that objects of the predetermined object type 124 have been detected in images associated with or depicting individual A. Alternatively or in addition, the database may indicate that individual A is otherwise associated with one or more suppliers of handbags. For example, individual A may follow a handbag supplier on TWITTER®, be employed by the handbag supplier according to a social networking site such as LinkedIn, or have "liked" the handbag supplier's FACEBOOK® page (TWITTER is a registered mark of Twitter, Inc. of San Francisco, Calif.). The context based verification tests 136 may search the database for associations between the predetermined object type 124 and any individuals depicted in or otherwise associated with the source image 204. The context based verification tests 136 may increase the belief scores of the candidate objects 132 when associations are found in the database.

The context information 214 may include text-based social data associated with the source image 204. The text-based social data associated with the source image 204 may be any text associated with the source image 204 in the social networking service 102. Examples of the text-based social data may include album titles, photo captions, and/or comments. For example, the predetermined object type 124 may be a dog and the source image 204 may be a photo pulled from the social networking service 102. Someone may have commented on the photo with the words "cute dog." In an alternative example, the source image 204 may be an album cover for an album entitled "puppy play-date." In these two examples, the text-based social data may be "cute dog" and "puppy play-date," respectively. As a result of finding a word and/or a phrase associated with the predetermined object type 124 in the text-based social data that is associated with the source image 204, the context based verification tests 136 may increase the belief scores of the candidate objects 132.

The context information 214 may include the weather on the day the source image 204 is captured. The context based verification tests 136 may extract the capture date and the physical location of the source image 204 from the metadata of the source image 204 or other source. The context based verification tests 136 may identify the weather on the capture date at the physical location from a database of known weather conditions. The context based verification tests 136 may adjust the belief scores of the candidate objects 132 based on a likelihood of the predetermined object type 124 being depicted in a photo on the capture date at the physical location.

In one such example, the predetermined object type 124 may be an umbrella. The metadata of the source image 204 may indicate that the source image 204 was captured on Apr. 14, 1991 in Arlington, Va. The context based verification tests 136 may determine whether it was raining on the capture date in the capture location from the database of known weather conditions. The context based verification tests 136 may increase the belief scores of the candidate objects 132 if the database indicates that it rained on Apr. 14, 1991 in Arlington, Va.

The belief score 510 and/or the adjusted belief score 514 is generated (508 and/or 514) for each candidate object and corresponding reference image. In other words, when multiple reference images 140 are compared with each candidate object, multiple belief scores and/or adjusted belief scores may be generated for each candidate object.

For each candidate object, the belief score 510, the adjusted belief score 514, the highest of the belief scores, and/or the highest of the adjusted belief scores may be compared to a predetermined threshold. The predetermined threshold may represent a threshold belief score at which the candidate object 314 is considered an object of the predetermined object type 124. The location of the candidate object 314 may be stored in the memory 112.

The highest of the belief scores and/or the highest of the adjusted belief scores for each candidate object may be stored in the memory 112. In addition, the size, the type of object, and the reference image that compared most similarly with each candidate object may be stored in the memory 112.

The stored information, such as the belief score 510 or the adjusted belief score 514 may be presented to a user in the GUI 146 as a number, percentage, or in in word format. The word format may be a word, symbol, or phrase that represents level of confidence that the candidate object is, indeed, an object of the predetermined object type 124.

With knowledge of the reference object 350 that best matched (highest belief score and/or adjusted belief score) the candidate object 314, additional determinations may be made about the candidate object 314. For example, a brand of a beverage or type of bottle may be determined for bottle objects. The additional determinations made based on the knowledge of the best matched reference object may be useful to advertisers or other parties.

FIG. 6 illustrates an example 600 of the graphical user interface (GUI) 146 for building cascade classifiers used by the object detection module 126. A user may create any number of cascade classifiers for any object using the GUI 600. The GUI 600 may include, for example, an options section 602, a positive image section 604, and a negative image section 606.

The options section 602 may include options that determine the behavior of the cascade classifier as a whole. For example, the options section 602 may display, and facilitate adjustment of, a type of cascade classifier (such as Haar, Hog, or LBP), the width and height of template images, the number of stages in the cascade classifier, and a maximum allowable number of false alarms.

The positive image section 604 may display, and facilitate adjustment of, a positive image collection. The positive image collection is a collection of example images of the predetermined object type 124 that the cascade classifier 130 is to positively identify when applied to any source image. Similarly, the negative image section 606 may display, and facilitate adjustment of, a negative image collection. The negative image collection is a collection of example images that do not depict objects of the predetermined object type 124.

The graphical user interface 600 may provide for simple and efficient creation of cascade classifiers from scratch. The custom creation of an xml cascade, for example, may comprise preparing a set of positive images that embody the predetermined object type 124, and a set of negative images that do not contain the predetermined object type 124. The number of steps 608 in the cascade process and a false alarm rate 610 of the cascade process may be adjusted in order to alter the sensitivity of the cascade.

Furthermore, the GUI 600 may create or modify the cascade classifier 130 for any object type simply and quickly. The ability of the GUI 600 to create an xml cascade (or any other type of cascade classifier) for any type object may eliminate a reliance on available cascades that have a limited detection scope. In addition, the graphical user interface 600 may facilitate creation of cascade classifiers that are overly sensitive to positive matches, unlike many cascades available for download. The cascade classifiers may be overly sensitive to positive matches, and hence detect more false positives, because the verification module 128 may eliminate the false positives from final set of the detected objects 122.

FIG. 7 illustrates an example 700 of the graphical user interface (GUI) 146 for testing and adjusting parameters of the object detection module 126 and the verification module 128. The GUI 70 may include, for example, a parameter section 702, a feedback section 704, and an information panel 706.

The parameter section 402 may display, and facilitate adjustment of, the parameters 708 of the object detection module 126. Alternatively or in addition, the parameter section 402 may display, and facilitate adjustment of, parameters 710 of the verification module 128. For example, the parameters 710 of the verification module 128 may include the target difference values 506 used in the determination of the difference ratios 504 and the belief multipliers 512 used to adjust the impact of each characteristic on the belief score 510. Additional parameters may be available for display and adjustment in the parameter section 702, such as configuration of skin tones, key point and descriptor parameters, background matching, and the belief threshold to pass the final result to the end user interface.

The feedback section 704 may provide a testing feedback mechanism. A test source image 712 may be loaded into the feedback section 704. The types of objects 714 to search for may be selected. The scan engine 114 may execute the object detection module 126 and the verification module 128 using the parameters set in the parameter section 702. The test source image 712 may be displayed along with graphical information reflecting results of the execution of the scan engine 114.

The graphical information may provide insight into intermediate results obtained during the execution of the scan engine 114 for a single selected object type. The example illustrated in FIG. 7 is a search for plastic cups.

In one example of such graphical information, the faces 212 detected by the object detection module 126 may be displayed as squares or rectangles surrounding the positively-identified faces. If a face was not properly detected in the test source image 712, then the user may adjust the cascade classifier for faces, and re-run the test.

Another example of the graphical information may be identification 716 of the candidate objects 132 detected in the test source image 712 by the cascade classifier 132 for the predetermined object type 124 but that are not verified by the verification module 128. The unverified candidate objects 716 may have belief scores and/or adjusted belief scores that are below the belief threshold 718. The candidate objects 132 in the test source image 712 that are not verified may be identified by enclosing rectangles 716, which correspond to locations and sizes of areas detected as matching the cascade parameters.

Yet another example of the graphical information may be identification of the detected objects 122, which are the candidate objects 132 that are verified by the verification module 128. The detected objects 122 may be identified by rectangles in the test source image 712 that represent locations and sizes of areas enclosing the detected objects 122. If an object of the predetermined object type 124 was not properly detected in the test source image 712, then the user may adjust any of the parameters 708 and 710, and re-run the test to determine whether the adjustments improved the accuracy in recognizing the detected objects 122.

The information panel 706 may provide additional feedback information. For example, the information panel 706 may display any textual output of the scan engine 114 for analysis, along with final results. Each of the rectangles in the test source image 712 may be numbered in the test source image 712. The information panel 706 may display information related to the objects in the rectangles. For example, the information panel 706 may display the location, the size, the difference values 412, the difference ratios 504, the belief score 510, and/or the adjusted belief score 516 for each of the candidate objects 132 next to a number of the corresponding candidate object. Alternatively or in addition, the information panel may display the characteristics of the candidate objects 132 and/or the reference images 140. The final results may include, for example, the location, size, the object type, and the belief score of each of the detected objects 122.

The ability to adjust the parameters 708 and 710 and/or other aspects of the system 100 from within the graphical user interface 700, and rapidly test and evaluate the adjustments, provides a dynamic and efficient tuning of the object recognition process. A user without extensive experience in object recognition technologies may test, evaluate, and improve the object recognition process for a large number of object types.

FIG. 8 illustrates an example 800 of the graphical user interface (GUI) 146 for testing and adjusting the parameters 708 and 710 in a search for multiple object types 714 in a single test source image 802. As in FIG. 7, rectangles may overlay the verified and unverified candidate objects 132 in the feedback section 704 to represent the locations and sizes of the candidate objects 132 found by the object detection module 126, as well as the detected objects 122, which are the candidate objects 132 that are verified by the verification module 128. In one example, yellow and purple rectangles may indicate objects detected but not verified, and white, light blue, green, and blue rectangles may indicate objects that were detected and verified by meeting the belief threshold for the respective object types. Each color may correspond to one of the object types.

Figure 9:
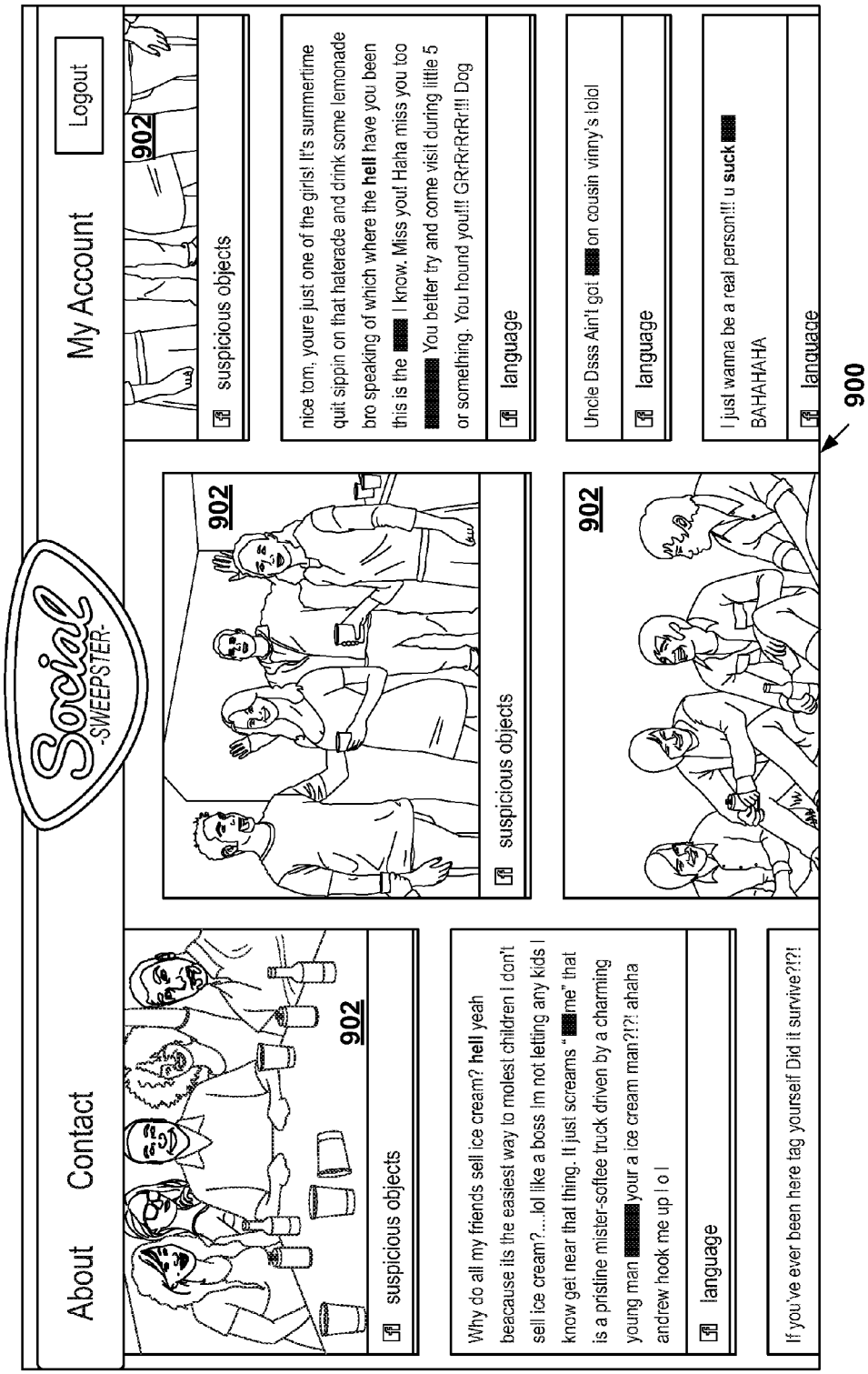
FIG. 9 illustrates a graphical user interface for presenting images and text available in the social networking service in which objectionable material is detected.

FIG. 9 illustrates an example 900 of the graphical user interface (GUI) 146 for presenting images 902 and text that are available in the social networking service 102 and in which objectionable material is detected. The images 902 may be organized from greatest threat level (highest belief score) to lowest threat level that exceeds the belief threshold 718 used by the scan engine 114. The predetermined object types that the scan engine 114 searches the source images for may be a set of object types that are identified as objectionable. The object recognition device 104 may obtain the source images by searching the social networking service 102 for images that are to be scanned by the scan engine 114.

Figure 10:
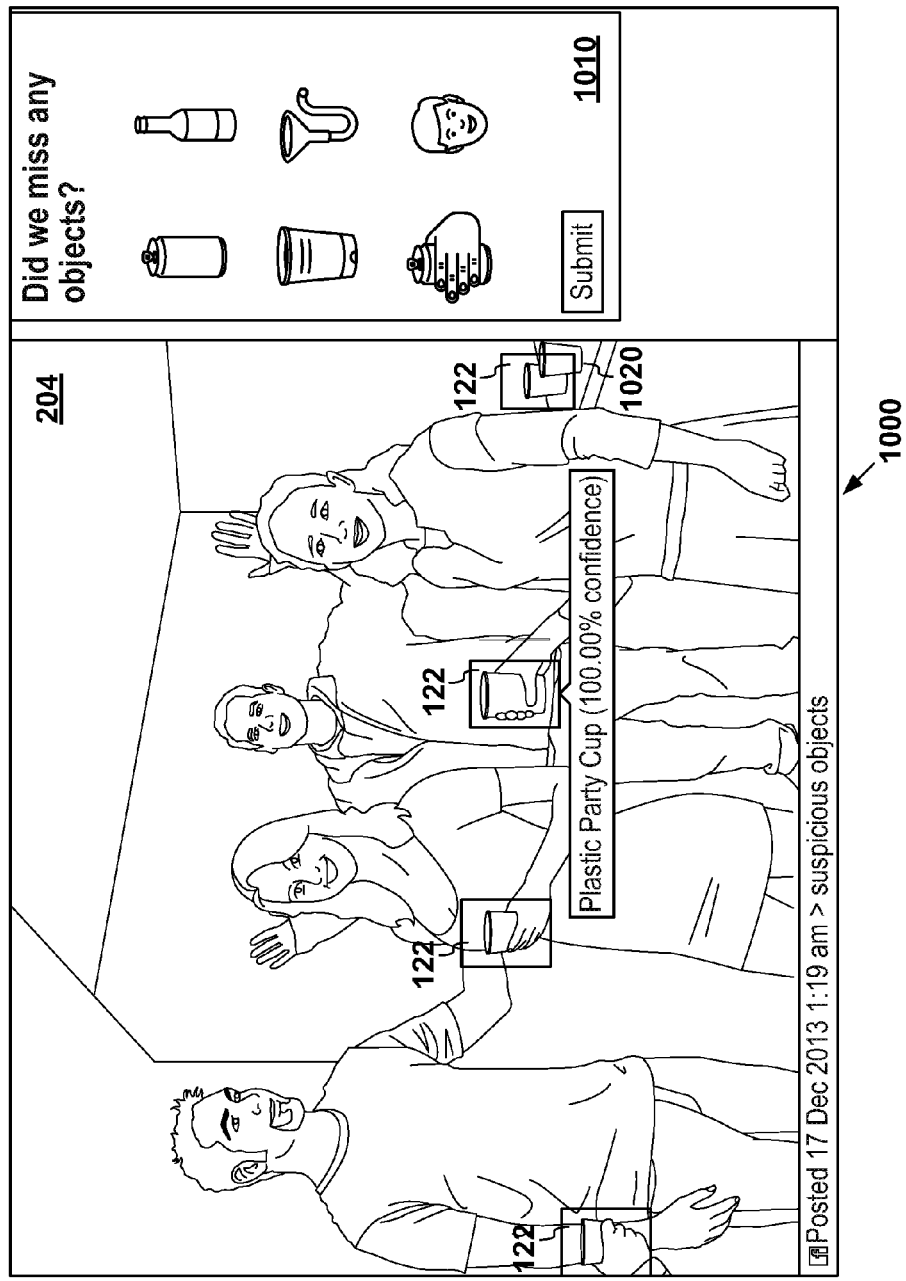
FIG. 10 illustrates an example of a graphical user interface for providing feedback to improve the accuracy of object recognition.

FIG. 10 illustrates an example 1000 of the graphical user interface (GUI) 146 for a user to provide feedback that the object recognition device 104 may use to improve the accuracy of object recognition. The GUI 1000 may display the source image 204. The source image 204 may be selected by a user from the GUI illustrated in FIG. 9 or selected in any other manner. In the example illustrated in FIG. 10, the source image 204 is scanned by the scan engine 114 for plastic cups and for any objects found to be "in-hand." Objects that are "in-hand" may be objects held in a hand, or in some examples, held in a hand in a suspicious manner. The detected objects 122 may be identified in the source image 204 with a rectangle.

The user may select any of the detected objects 122 for further information about the selected object. For example, the GUI 1000 may display the belief score or a threat risk in easy to understand terms, such as "highly likely", "100.00% confidence" or "minimal threat."

The user may also provide provide feedback, which may be used to help improve the accuracy of the process during future testing and adjustment. For example, the GUI 1000 may display a collection of predetermined object types 1010 that the scan engine 114 searched the source image 204 for. The user may select any of the predetermined object types 1010 that are depicted 1020 in the source image 204 but that were not identified as being one of the detected objected 122.

The system 100 may be implemented with additional, different, or fewer components. For example, the system 100 may include only the object recognition device 104. In other examples, the object recognition device 104 may not include the context based verification tests 136.

The logic flows illustrated in FIGS. 2-5 may include additional, different, or fewer operations than illustrated. The operations may be executed in a different order than illustrated.

Each component may include additional, different, or fewer components. In one such example, each of the client devices 106 may include a copy of all or a portion of the object recognition device 104. In another example, the reference image based verification tests 134 may include the scoring module 138 or a portion thereof. In still another example, the verification module 128 may not include the context based verification tests 136. The GUI 146 generated on any of the client devices 106 may include only the admin GUI 148, only the end user GUI 150, or both the admin GUI 148 and the end user GUI 150.

The system 100 may be implemented in many different ways. Each module, such as the scan engine 114, the object detection module 126, the verification module 128, the reference image based verification tests 134, the context based verification tests 136, the scoring module 138, the scan engine GUI module 116, and/or the object detection service GUI module 118, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 112, for example, that comprises instructions executable with the processor 110 or other processor to implement one or more of the features of the module. When any one of the module includes the portion of the memory that comprises instructions executable with the processor, the module may or may not include the processor. In some examples, each module may just be the portion of the memory 112 or other physical memory that comprises instructions executable with the processor 110 or other processor to implement the features of the corresponding module without the module including any other hardware. Because each module includes at least some hardware even when the included hardware comprises software, each module may be interchangeably referred to as a hardware module, such as the object detection hardware module 126, the verification hardware module 128, the reference image based verification tests hardware module 134, the context based verification tests hardware module 136, the scoring hardware module 138, the scan engine GUI hardware module 116, and/or the object detection service GUI hardware module 118.

In the example illustrated in FIG. 5, the context based verification tests 136 adjust the belief score 510 determined from the difference ratios 504 and the belief multipliers 512. Alternatively, the context based verification tests 136 may also generate difference ratios that are multiplied by corresponding belief multipliers in the determination of the belief score 510. The difference ratios for the context based verification tests 136 may represent a difference between the candidate object 314 and corresponding characteristics of the predetermined object type.

The processor 110 may be in communication with the memory 112. In one example, the processor 110 may also be in communication with additional elements, such as a network interface and/or a display device. Examples of the processor 110 may include a general processor, central processing unit, a controller, an application specific integrated circuit (ASIC), a digital signal processor, a field programmable gate array (FPGA), a digital circuit, and/or an analog circuit.

The processor 110 may be one or more devices operable to execute logic. The logic may include computer executable instructions or computer code embodied in the memory 112 or in other memory that when executed by the processor 110, cause the processor 110 to perform the features of the object recognition device 104. The computer code may include instructions executable with the processor 110.

Some features are described as implemented in a computer readable storage medium (for example, as logic implemented as computer executable instructions or as data structures in the memory 112). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device. However, the computer readable storage medium is not a transitory transmission medium for propagating signals.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is exemplary in nature, rather than limiting. For example, although selected aspects, features, or components of the implementations are depicted as being stored in memories, all or part of the system or systems may be stored on, distributed across, or read from other computer readable storage media, for example, secondary storage devices such as hard disks, flash memory drives, floppy disks, and CD-ROMs. Moreover, the various modules and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program or apparatus. The components may be resident on separate hardware, such as separate removable circuit boards, or share common hardware, such as a same memory and processor for implementing instructions from the memory. Programs may be parts of a single program, separate programs, or distributed across several memories and processors.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. An object recognition system comprising:
an object detection module configured to apply a cascade classifier to a source image, wherein application of the cascade classifier results in identification of candidate objects for a predetermined object type;
a plurality of verification tests, each of the verification tests configured to generate a plurality of difference values for a candidate object identified by the object detection module and a corresponding reference image, wherein the corresponding reference image depicts an object of the predetermined object type, and wherein each one of the difference values represents an indication of a difference between a characteristic of the candidate object and a characteristic of the corresponding reference image;
a scoring module configured to determine, for each of the candidate objects, a belief score for the candidate object based on the difference values for the candidate object, wherein the belief score indicates a likelihood that the candidate object is of the predetermined object type; and
a verification module configured to identify a set of detected objects based on the candidate objects and the belief scores for the candidate objects.

2. The system of claim 1, wherein the characteristic of the candidate object includes a histogram.

3. The system of claim 1, wherein the characteristic of the candidate object includes color in a red, green, blue space.

4. The system of claim 1, wherein the characteristic of the candidate object includes color in a hue, saturation, and value color space.

5. The system of claim 1, wherein the characteristic of the candidate object includes key points.

6. The system of claim 1, wherein the characteristic of the candidate object includes a skin ratio.

7. A non-transitory computer readable storage medium comprising computer executable instructions, the computer executable instructions executable by a processor, the computer executable instructions comprising:
instructions executable to identify a plurality of source images that are shared in a social networking service;
instructions executable to detect a candidate object in any of the source images that an application of a cascade classifier indicates is an object of a predetermined object type;
instructions executable to generate difference values based on comparisons of a plurality of characteristics of the candidate object with corresponding characteristics of a reference image, wherein each one of the difference values indicates a difference between a respective one of the characteristics of the candidate object and a corresponding respective one of the characteristics of the reference image;
instructions executable to generate a belief score for the candidate object based on differences between the difference values and target difference values, wherein the belief score indicates a likelihood that the candidate object is an object of the predetermined object type; and
instructions executable to identify any of the source images that comprises the candidate object as including the predetermined object type when the belief score exceeds a threshold belief score.

8. The computer readable storage medium of claim 7 further comprising instructions executable to generate a graphical user interface in which the target difference values are configurable.

9. The computer readable storage medium of claim 7 further comprising instructions executable to generate a graphical user interface in which the cascade classifier is configurable.

10. The computer readable storage medium of claim 7 further comprising instructions executable to generate the belief score based on belief multipliers and differences between the difference values and target difference values, wherein each of the multipliers is multiplied by a corresponding one of the differences.

11. The computer readable storage medium of claim 7 further comprising instructions executable to generate a graphical user interface that identifies any of the source images from the social networking service determined to include one or more of a plurality of predetermined object types.

12. A method to recognize objects in an image, the method comprising:
searching a source image for any candidate objects of a predetermined object type by applying a cascade classifier associated with the predetermined object type to the source image;
determining a likelihood that each candidate object is an object of the predetermined object type by:
determining a plurality of scores for a candidate object from a plurality of verification tests applied to the candidate object, each one of the scores determined from a corresponding one of the verification tests, wherein each one of the scores represents an indication of a difference between the candidate object and a set of reference images for the predetermined object type; and
determining a belief score for the candidate object from the scores for the candidate object, the belief score indicating the likelihood that the candidate object is of the predetermined object type; and
identifying the candidate object as a detected object of the predetermined object type when the belief score relative to a threshold belief score indicates the candidate object is of the predetermined object type.

13. The method of claim 12 wherein determining a likelihood that each candidate object is an object of the predetermined object type further comprises adjusting the belief score based on a comparison of an image size of the candidate object with an image size of a face detected in the source image.

14. The method of claim 12 wherein determining a likelihood that each candidate object is an object of the predetermined object type further comprises adjusting the belief score based on a comparison of an image size of the candidate object with an image size of the source image.

15. The method of claim 12 wherein determining a likelihood that each candidate object is an object of the predetermined object type further comprises adjusting the belief score based on a location of the candidate object relative to a location of a face detected in the source image.

16. The method of claim 12 wherein determining a likelihood that each candidate object is an object of the predetermined object type further comprises adjusting the belief score based on a location of the candidate object within in the source image.

17. The method of claim 12 wherein determining a likelihood that each candidate object is an object of the predetermined object type further comprises adjusting the belief score based on a percentage of skin tones in the candidate object.

18. The method of claim 12 wherein determining a likelihood that each candidate object is an object of the predetermined object type further comprises adjusting the belief score based on a color of the candidate object compared to a background color of the source image.

19. The method of claim 12 further comprising adjusting a size of the source image to a target size before searching the source image for any objects of the predetermined object type.

20. The method of claim 12 wherein determining a likelihood that each candidate object is an object of the predetermined object type further comprises adjusting the belief score based on geo-location data included in metadata of the source image.

21. The method of claim 12 wherein determining a likelihood that each candidate object is an object of the predetermined object type further comprises adjusting the belief score based on a date the image was captured, the date indicated in metadata of the source image.

22. The method of claim 12 wherein determining a likelihood that each candidate object is an object of the predetermined object type further comprises adjusting the belief score based on an amount of time between a capture date of the source image and a capture date of an image that includes an object of the predetermined object type and/or includes information associated with the predetermined object type.

23. The method of claim 12 wherein determining a likelihood that each candidate object is an object of the predetermined object type further comprises adjusting the belief score based on an identity of an individual in the source image.

24. The method of claim 12 wherein determining a likelihood that each candidate object is an object of the predetermined object type further comprises adjusting the belief score based on text-based social data associated with the source image.

25. The method of claim 12 wherein determining a likelihood that each candidate object is an object of the predetermined object type further comprises adjusting the belief score based on an indication of weather during a capture date of the source image.

* * * * *